United States Patent [19]

Domvile

[11] Patent Number: 5,093,007
[45] Date of Patent: Mar. 3, 1992

[54] PROCESS FOR REMOVAL OF INORGANIC AND CYANIDE CONTAMINANTS FROM WASTEWATER

[75] Inventor: Serena J. Domvile, Vancouver, Canada

[73] Assignee: NERCO Minerals Company, Vancouver, Wash.

[21] Appl. No.: 529,006

[22] Filed: May 24, 1990

[30] Foreign Application Priority Data

May 24, 1989 [CA] Canada ................................ 600472

[51] Int. Cl.$^5$ ............................ C02F 1/58; C02F 1/72
[52] U.S. Cl. .................................. 210/713; 210/717; 210/721; 210/667; 210/684; 210/724; 210/759; 210/763; 210/904; 210/911; 423/87; 423/602
[58] Field of Search ............... 210/702, 709, 710, 712, 210/713, 721, 722, 724, 758, 759, 747, 717, 904, 911, 912, 727, 726, 667, 684, 688, 763; 423/87, 602

[56] References Cited

U.S. PATENT DOCUMENTS

| | | | |
|---|---|---|---|
| 4,288,328 | 9/1981 | Montgomery | 210/713 |
| 4,343,706 | 8/1982 | Etzel et al. | 210/712 |
| 4,465,597 | 8/1984 | Herman et al. | 210/912 |
| 4,566,975 | 1/1986 | Allgulon | 210/911 |
| 4,606,829 | 8/1986 | Rice et al. | 210/904 |
| 4,622,149 | 11/1986 | Devayst et al. | 210/721 |
| 4,705,638 | 11/1987 | Ganczarczyk | 210/721 |
| 4,710,301 | 12/1987 | Geuens | 210/912 |
| 4,915,849 | 4/1990 | Griffiths et al. | 210/904 |

FOREIGN PATENT DOCUMENTS 197709 4/1971 U.S.S.R. ............................ 210/911

OTHER PUBLICATIONS

"Removal of Arsenic (V) from Water by Adsorption on Aluminum and Ferric Hydroxides", by John H. Gulledge and John T. O'Connor, pp. 548–552, Journal of AWWA, (1973).

Arsenic: Industrial, Biomedical, Environmental Perspectives, W. H. Lederer and R. J. Fensterheim, eds., Van Nostrand Reinhold Company, pp. 272–276.

*Primary Examiner*—Stanley S. Silverman
*Assistant Examiner*—Neil M. McCarthy
*Attorney, Agent, or Firm*—Stoel, Rives, Boley, Jones & Gray

[57] ABSTRACT

An improved process for removal of soluble contaminants from wastewater is disclosed which provides significantly enhanced contaminant removal and overall process efficiencies. The improved contaminant removal process is especially suitable for treatment of industrial effluents having high levels of dissolved cyanide and arsenic contaminants. Wastewater undergoes multiple stage sludge treatment, wherein sludge is mixed with wastewater sequentially in a plurality of discrete reaction stages for relatively short retention times. Reaction conditions which promote chemical and/or physical reaction of soluble contaminants with sludge are maintained, and liquid/solids separation is effected after each sludge treatment stage. Oxidizing agent is preferably mixed with the wastewater prior to multiple stage sludge treatment to change the oxidation state of inorganic contaminants and remove cyanide contaminants from solution. Multiple stage sludge treatment may be combined with an improved ferric adsorption process to provide substantially complete removal of inorganic and/or cyanide contaminants.

18 Claims, 3 Drawing Sheets

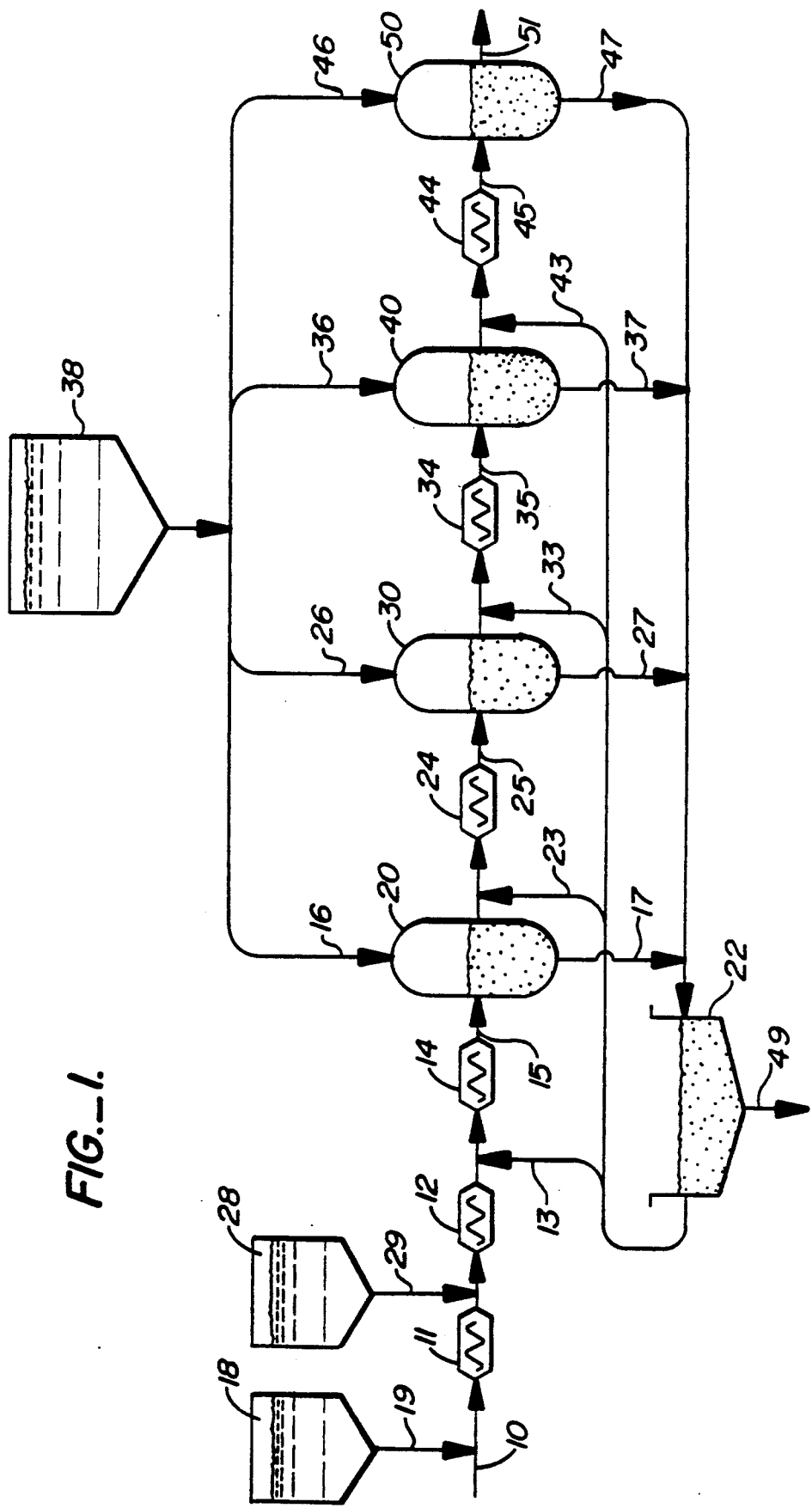
FIG._1.

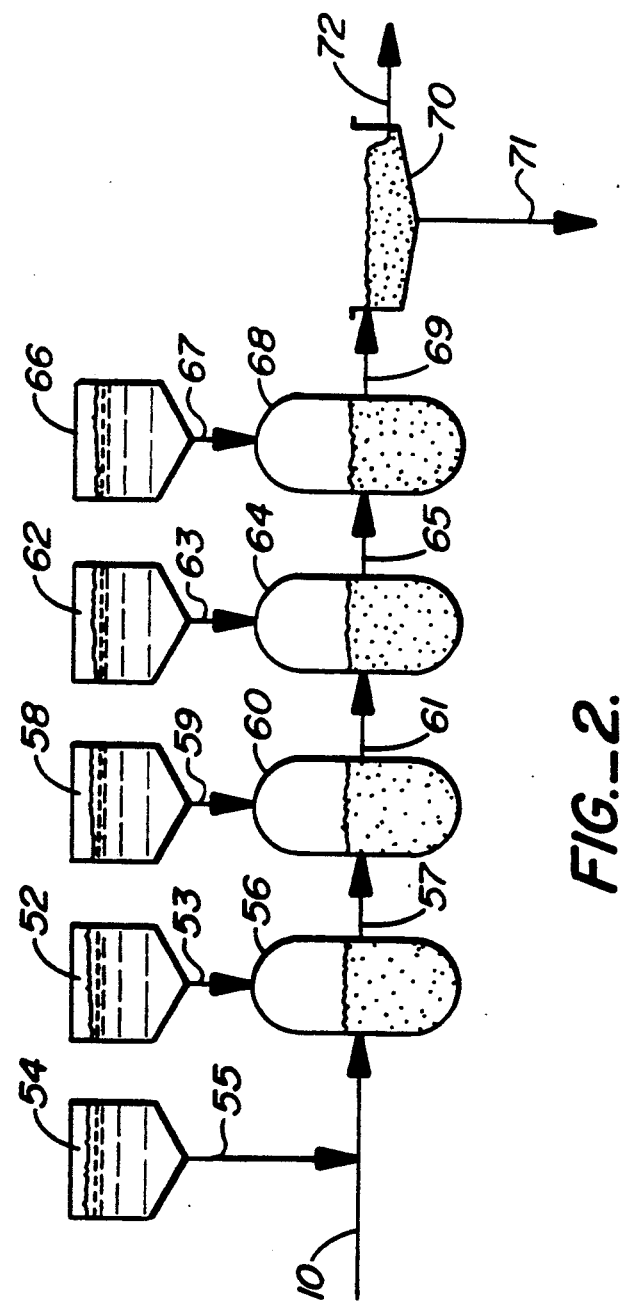
FIG._2.

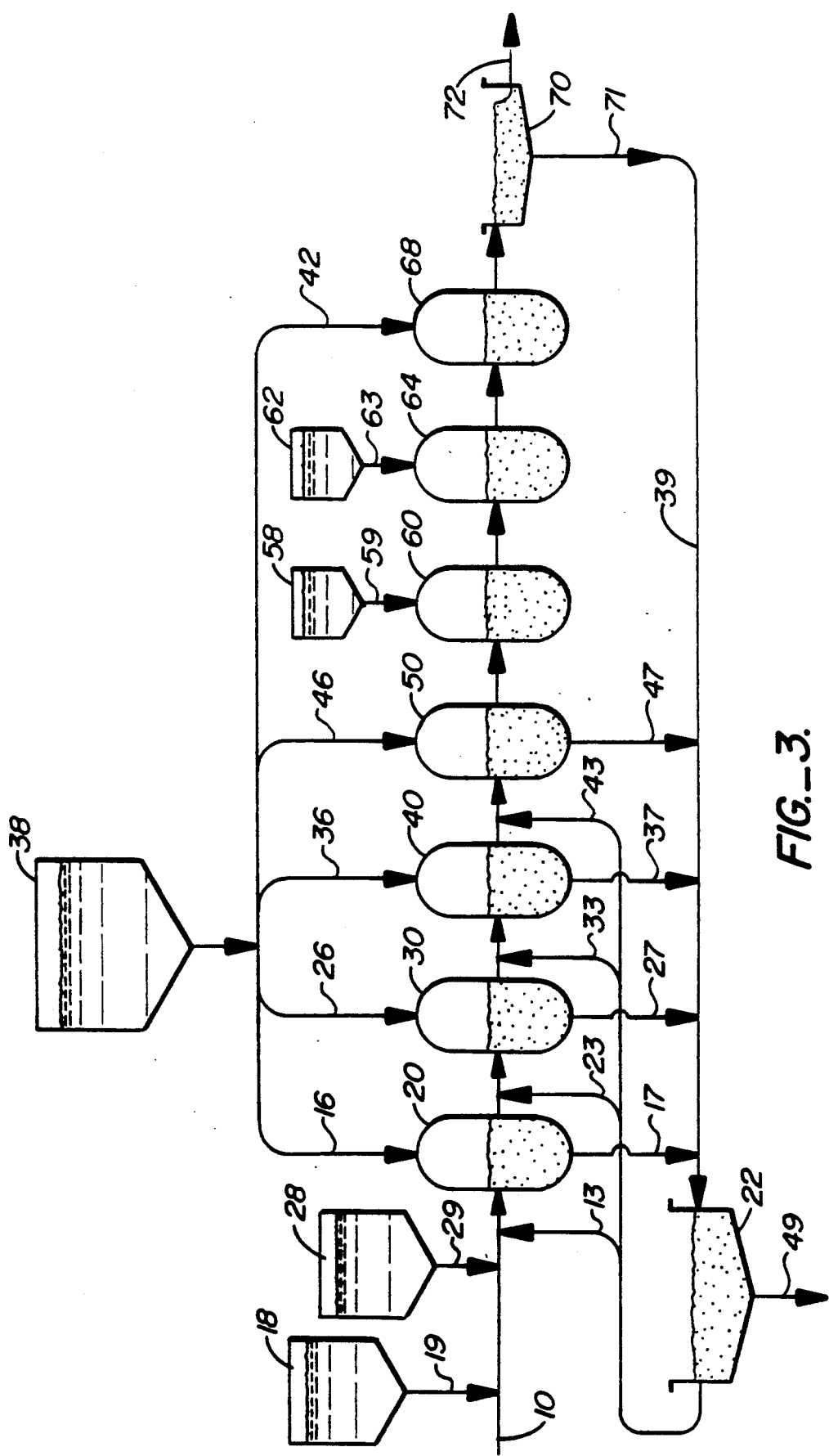
FIG._3.

PROCESS FOR REMOVAL OF INORGANIC AND CYANIDE CONTAMINANTS FROM WASTEWATER

TECHNICAL FIELD

The present invention relates generally to an improved process for removal of contaminants from wastewater. The process of the present invention is particularly suitable for removal of soluble arsenic and other inorganic and cyanide contaminants from wastewater generated during mining, milling and other industrial operations.

BACKGROUND ART

Metallic gold is conventionally extracted from gold-containing ores by dissolution in cyanide solutions. During the extraction process, large quantities of liquid wastes containing appreciable concentrations of cyanide, thiocyanate, and inorganic contaminants are produced. To protect the environment and to comply with governmental regulations, it is generally necessary to treat wastewater effluents for removal of toxic inorganic and cyanide constituents prior to discharge of wastewater effluents to the environment. Wastewater effluent from numerous other industrial processes likewise requires treatment for removal or reduction of inorganic constituents.

Retention of wastewater in tailings ponds is the oldest, and still a common method for treatment of gold mill wastewater effluents. Wastewater retention in a tailings pond promotes separation and settling of particulate contaminants. Many metals are soluble in wastewater as a result of cyanide complexing and contribute substantially to high levels of inorganic contamination. Retention of wastewater in tailings ponds additionally promotes photodegradation of both free and metallocyanides contained in the wastewater upon exposure to ultraviolet light. It has been suggested that aeration of wastewater collected in a tailings pond promotes contact of soluble cyanide with atmospheric carbon dioxide and converts soluble cyanide contaminants to a volatile form (HCN) which is eliminated from the pond. Although wastewater retention in tailings ponds may be effective to provide reduced levels of contamination, it generally cannot provide wastewater purification sufficient for direct discharge. Severe climatic conditions seriously impair the efficacy of tailings ponds, since natural degradation, photodegradation, precipitation and volatilization of contaminants cannot occur when the pond is frozen. Alternative methods for removal of contaminants must therefore be adopted where retention in tailings ponds is impractical or unfeasible, or it provides incomplete purification.

Ores containing significant amounts of arsenopyrite (generally in excess of 1% As) are not readily amenable to cyanidation. Arsenopyrite containing ores are typically concentrated by flotation and roasted during the milling process prior to cyanidation. Roasting releases oxidized forms of arsenic and sulfur constituents from the ore, and it produces wastewater and residues having high levels of arsenic contaminants. Mill wastewater effluent containing high levels of soluble arsenic is typically discharged to tailings retention ponds. Residues containing high levels of arsenic may be processed in arsenic reclamation plants or otherwise processed for recovery of soluble contaminants. Process water, cooling water and other process wastes associated with contaminant recovery are also discharged to tailings retention ponds and contribute significantly to contaminant arsenic levels, particularly in wastewater. Recent increases in gold mining activity, depletion of high purity gold ores, and stricter environmental regulations have resulted in heightened interest in processes for removal of cyanide, arsenic and other inorganic contaminants from wastewater generated during gold milling and other industrial operations. Effective effluent treatment providing removal of soluble contaminants, particularly cyanide and arsenic contaminants, permits mining of ores which contain high levels of arsenopyrite and other contaminants. Providing accessibility to lower grade ores by providing economically feasible methods for partitioning contaminants is increasingly important as sources of higher grade ores are rapidly being depleted.

Several methods for removal of cyanide from gold mill effluents have been proposed and implemented. The alkaline chlorination process for the destruction of cyanide involves oxidation of cyanide by the hypochlorite ion at a basic pH. Liquid chlorine or solid calcium hypochlorite typically provides the source of hypochlorite ion. The Inco $SO_2$/Air process utilizes mixtures of $SO_2$—$O_2$ to promote oxidation of cyanide constituents in the presence of a soluble copper catalyst and under basic pH reaction conditions. Hydrogen peroxide has also been used as an oxidizing agent for removal of cyanide constituents in conjunction with a soluble copper catalyst. Biological removal of cyanide in a two stage digestion process has also been proposed. Acidification/volatilization/reneutralization processes based upon the volatility of the hydrogen cyanide produced when cyanide solutions are acidified have been developed. Cyanide removal by adsorption on ferrous sulfide has also been utilized, requiring Fe:CN ratios of at least about 3:1.

Removal of soluble arsenic from milling wastewater is also important where ores contain appreciable amounts of arsenopyrite. Conventional processes utilize ferric sulphate to provide ferric oxide and/or hydroxide particulates in the wastewater solution for precipitation of solubilized arsenic from wastewater by adsorption. Conventional processes for removal of soluble arsenic contaminants by adsorption on ferric particulates can be quite costly due to the chemical reagent requirements. In addition, treatment of wastewater containing elevated levels of arsenic using conventional ferric adsorption processes may result in a dramatic reduction in wastewater throughput and unacceptable arsenic removal levels and efficiencies.

Many of the processes described above for removal of cyanide and arsenic contaminants which have been implemented on a commercial scale are described in "State-of-the-Art of Processes for the Treatment of Gold Mill Effluents", J. Ingles and J. S. Scott, Mining, Mineral and Metallurgical Processes Division, Industrial Programs Branch, Environmental Protection Programs Directorate, July 1985.

U.S. Pat. No. 4,566,975 teaches a method for arsenic removal including at least two stages, wherein a precipitation agent comprising ions capable of forming insoluble hydroxide precipitates is added during a second or later process stage, and the solids precipitated are separated and returned to the first precipitation stage. Ferric sulphate may be introduced to first and second precipitation tanks, and sludge comprising arsenic and other contaminants adsorbed on ferric hydroxide particulates may be recycled from the second precipitation stage to the first precipitation stage, or to a premixing stage. Sludge is separated from liquids after first and second stage precipitation, but sludge is not separated from liquids after the preliminary premixing stage. The precipitation stages are carried out under basic reaction conditions at an elevated pH of about 8 to 9. Japanese patent publication J6 0125-292A teaches removal of soluble arsenic compounds from wastewater by adding a ferric (Fe III) compound to the effluent and adjusting the pH of the mixture to about 6-9 to coprecipitate ferric hydroxide and the complex formed between Fe(III) and arsenic-containing anionic complexes. The improvement comprises adding the Fe(III) compound to the effluent in the presence of sludge, thereby reducing the amount of Fe(III) compound which must be added to precipitate the solubilized arsenic.

U.S. Pat. No. 4,622,149 teaches an improvement to the Inco $SO_2$/Air process which contemplates addition of effective ferric ion in an amount of about three times the weight of the total arsenic and/or antimony content in the effluent. The teachings of the '149 patent describe use of the effective ferric ion in the second process stage in combination with the standard Inco $SO_2$/Air process wherein effluent is treated with $SO_2$ and oxygen in the presence of soluble copper to produce treated effluent having a low inorganic contaminant content.

British Patent Specification 1,502,775 teaches removal of arsenic from acidic aqueous solutions by treatment with an arsenic precipitant (lime) in the first process stage to remove the bulk of solubilized arsenic, followed by treatment of the supernatant liquid with ferric or ferrous ion salts and an excess of oxidizing agent in a second process stage to complete arsenic precipitation. The oxidizing agent appears to be added contemporaneously with or subsequent to addition of the ferric ion salt.

U.S. Pat. No. 4,366,128 teaches removal of soluble arsenate from a solution at an elevated pH by adding a soluble barium salt to precipitate the arsenic as barium arsenate. U.S. Pat. No. 4,201,667 teaches removal of solubilized arsenic by addition of lime in the presence of phosphorus and oxidation of remaining arsenic constituents by addition of chlorine or hypochloride. U.S. Pat. No. 4,241,039 teaches removal of arsenic from acidic solutions wherein ferrous ions in solution are oxidized in the presence of oxygen under pressure and sulfuric acid. U.S. Pat. No. 4,025,430 teaches precipitation of metal ions and removal of hydroxides by addition of a soluble silicate solution. Japanese patent document J5 7150-478 teaches precipitation of solubilized arsenic using a ferric salt and if necessary, an oxidizing agent, and subsequently contacting the solution with an ion exchanger composed of amphoteric metal oxide hydrate to adsorb contaminants. Greek Patent Document SU 0710985 teaches precipitation of solubilized arsenic by iron-containing compounds followed by a biological digestion process.

Sabilization of solid arsenic trioxide ($As_2O_3$) generated during roasting by chemical conversion to ferric arsenate is discussed in "Production of Environmentally Acceptable Arsenites-Arsenates from Solid Arsenic Trioxide," M. Stefanakis, A. Kontopoulis, Arsenic *Metallurgy Fundamentals and Applications.* p.287, Proceedings of Symposium sponsored by TMS-AIME Physical Chemistry Committee and Mackay Minerals Research Institute, 1988 TMS Annual Meeting. Oxidation of arsenic in solution by addition of hydrogen peroxide was followed by addition of ferric sulfate. Experimental results indicated that the stability of iron arsenate precipitate is satisfactory provided the molar Fe:As ratio associated with the iron arsenate precipitate is maintained at about 2.0 or above, and that basic pH reaction conditions generally result in increased arsenic solubility.

U.S. Pat. No. 4,724,084 teaches a process for removal of toxic organic materials and metals from wastewater containing high levels of organic and metal contaminants. The '084 patent teaches a two stage treatment process wherein ferrous sulfide is introduced to the effluent prior to addition of hydrogen peroxide. The admixture is clarified by pH adjustment with lime, and separation of particulates is facilitated by addition of a flocculating agent. After sludge removal, a second similar process stage is conducted.

U.S. Pat. No. 4,680,126 relates to removal of non-ferrous metals from wastewater by selective precipitation of ferrous metal ions followed by precipitation of the non-ferrous metals. U.S. Pat. No. 4,606,829 teaches removal of complexed zinc-cyanide from wastewater and involves a sludge recycle feature including aeration of the sludge to improve sludge stability and oxidize precipitated ferrous hydroxide. U.S. Pat. No. 4,343,706 teaches removal of heavy metals by flocculation with ferric ions at a basic pH. U.S. Pat. No. 4,321,143 teaches a process for reducing the COD content of aqueous waste by treatment with hydrogen peroxide in the presence of transition metal compounds and thereafter subjecting the waste to conventional biological degradation.

Although many of the prior art methods described above for removing soluble inorganic and cyanide constituents from wastewater are effective for removing substantial quantities of soluble inorganic and cyanide constituents, the cost of operating many of these wastewater treatment processes may be prohibitively high. Adsorption of soluble arsenic on insoluble ferric particulates, referred to hereinafter as the "ferric adsorption process," is an attractive process because it does not require complex, specialized equipment or extensive manual supervision. In general, however, as the level of soluble inorganic and cyanide contaminants increases, the quantities of chemical reagents required for contaminant removal and thereby the cost, increases correspondingly. Many of the prior art wastewater treatment processes are directed to removal of one or a single class of contaminants from wastewater, and multiple treatments may be required for substantially complete purification of wastewater.

Accordingly, it is an objective of the present invention to provide a process for removal of soluble inorganic contaminants, and particularly arsenic, from wastewater which demonstrates improved overall contaminant removal and process efficiency.

It is another objective of the present invention to provide an improved process for removal of substantially all soluble arsenic from wastewater, which is capable of treating wastewater having high levels of arsenic and other inorganic contaminants at a high rate of throughput.

It is still another objective of the present invention to provide an improved process for removal of arsenic and other contaminants from wastewater which is adaptable for treating wastewater having a broad range of contamination levels without requiring modification of plant equipment or design.

It is yet another objective of the present invention to provide an improved wastewater process which provides removal of free and complexed cyanide contaminants as well as inorganic contaminants such as arsenic, in an integrated, simplified treatment process.

It is still another objective of the process of the present invention to provide an improved process for converting soluble arsenic in wastewater to insoluble compounds and/or complexes which are stable over a wide range of reaction conditions.

It is yet another objective of the present invention to provide an improved process for removal of soluble arsenic and other inorganic contaminants from wastewater which is useful as a pretreatment stage for existing wastewater treatment facilities to provide improved overall contaminant removal and process efficiency.

It is still another objective of the present invention to provide an improved process for removal of solubilized inorganic and/or cyanide contaminants from wastewater which is easily implemented without involving substantial equipment, chemical, energy or supervisory requirements.

SUMMARY OF THE INVENTION

Removal of soluble arsenic and other inorganic contaminants from wastewater according to the present invention involves treatment of wastewater with sludge comprising ferric (Fe III) particulates under reaction conditions promoting formation of ferric arsenates and adsorption of inorganic contaminants onto the ferric particulates. It is believed that the process of the present promotes both chemical reactions, whereby soluble arsenic contaminants are converted to stable ferric arsenate compounds and physical reactions, whereby soluble arsenic and other inorganic contaminants are complexed with ferric particulates by an adsorption mechanism. Multiple stage treatment, wherein sludge comprising ferric particulates is mixed with wastewater sequentially in a plurality of reaction vessels for relatively short retention times, followed by separation of solids from wastewater after each treatment stage, has been found to be most effective for removal of soluble arsenic and other inorganic contaminants from wastewater. Sludge withdrawn from one or more of the treatment stages may be recycled for use in subsequent treatment stages, and solids produced during ferric adsorption processes may also be utilized in one or more of the treatment stages to enhance overall process efficiency.

The multiple stage inorganic contaminant removal process of the present invention provides substantial removal of soluble arsenic from wastewater having wide ranges of total arsenic levels, for example, from about 10 mg As/L wastewater to several thousand mg As/L wastewater. In addition to providing substantial removal of soluble arsenic, the multiple stage treatment of the present invention provides improved removal of other soluble inorganic contaminants, such as manganese, nickel, silicon, strontium and other metal contaminants.

Removal of soluble inorganic, and particularly arsenic contaminants is enhanced by introduction of an oxidizing agent to the wastewater prior to sludge mixing and treatment. Much of the soluble arsenic in wastewater derived from gold mining and milling operations is present in the As(III) oxidation state. Chemical and physical reactions of soluble arsenic with sludge comprising ferric particulates to precipitate arsenic in a stable, insoluble form, are facilitated and proceed considerably more efficiently when soluble arsenic is present in the oxidized As(V) state. Oxidizing agent is preferably introduced into and mixed with wastewater prior to sludge treatment in an amount sufficient to provide substantially complete conversion of soluble arsenic to the oxidized As(V) state. Addition of oxidizing agent is generally unnecessary in subsequent sludge treatment stages provided that substantially all of the arsenic in solution has been converted to the oxidized As(V) state prior to sludge treatment. Introduction of excess oxidizing agent additionally converts iron constituents present in solution in the ferrous (Fe II) state to the desired ferric (Fe III) state.

Catalyzed oxidation is a primary mechanism for removal of cyanide contaminants from solution. When cyanide removal treatment is required due to elevated levels of cyanide contaminants in solution, cyanide removal may be achieved according to the process of the present invention, simply by introducing a suitable cyanide oxidation catalyst into the wastewater along with the oxidizing agent. The cyanide oxidation catalyst causes free cyanide in solution to form metallo-cyanide complexes which are more easily removed from solution by oxidation. Since oxidizing agent is used to facilitate removal of inorganic contaminants according to the process of the present invention, simultaneous removal of cyanide contaminants by catalyzed oxidation requires only addition of a suitable catalyst. An appropriate cyanide oxidation catalyst may be introduced prior to multiple stage sludge treatment, or in the ferric adsorption phase of an integrated contaminant removal process. Catalyzed oxidation of cyanide contaminants may also be combined with ultraviolet photodegradation to provide substantially complete removal of soluble cyanide contaminants from solution.

The multiple stage sludge treatment process of the present invention may be employed as a stand-alone treatment for removal of substantial quantities of inorganic and/or cyanide contaminants from solution, or it may be utilized in conjunction with other contaminant removal technologies as a pretreatment stage. Contaminant oxidation followed by multiple stage sludge treatment according to the present invention is advantageously utilized in conjunction with a ferric adsorption process to provide substantially complete removal of soluble arsenic and other inorganic contaminants, as well as soluble cyanide contaminants, at substantially reduced treatment costs. Wastewater which has undergone oxidation and multiple stage sludge treatment processes may be introduced directly to a ferric adsorption treatment process for final contaminant removal by addition of fresh chemical reagents Solids waste from the ferric adsorption process may be recycled to the multiple stage sludge treatment process to provide a closed system providing improved contaminant removal, while requiring reduced quantities of chemical reactants.

The integrated process of the present invention provides substantially complete conversion of soluble arsenic and other inorganic contaminants to stable ferric compounds and complexes, at substantially reduced Fe:As ratios compared to conventional ferric adsorption processes. Experimental results indicate that substantially complete removal of soluble arsenic may be accomplished at molar Fe:As ratios approaching about 1.0:1.0 or less. Contrary to many wastewater treatment processes for removal of soluble contaminants which require elevated pH reaction conditions, oxidation and multiple stage contaminant removal treatment according to the present invention are preferably carried out under neutral or acidic pH reaction conditions.

BRIEF DESCRIPTION OF THE DRAWINGS

The above-mentioned and additional features of the present invention and the manner of obtaining them will become apparent, and the invention will be best understood by reference to the following more detailed description read in conjunction with the accompanying drawings, in which:

FIG. 1 shows a schematic flow diagram illustrating a multiple stage sludge treatment process for removal of inorganic and cyanide contaminants according to the present invention;

FIG. 2 shows a schematic flow diagram illustrating an improved ferric adsorption treatment process for removal of inorganic and cyanide contaminants from aqueous solutions according to the present invention; and FIG. 3 shows a schematic flow diagram illustrating an integrated contaminant removal process according to the present invention incorporating the advantages of the processes shown in FIGS. 1 and 2.

DETAILED DESCRIPTION OF PREFERRED EMBODIMENTS

The process of the present invention utilizes mixing of sludge comprising ferric (Fe III) particulates with wastewater under reaction conditions which promote both chemical reactions of soluble inorganic contaminants, particularly arsenic, to form stable insoluble compounds, and physical reactions between soluble inorganic contaminants and ferric particulates to form stable complexes. As used herein, the term "sludge" is defined as a particulate admixture or suspension comprising ferric oxide and/or ferric hydroxide particulates and/or ferrous oxide or hydroxide particulates. Suitable sludge may be derived from a variety of sources, such as the bottom of tailings ponds, recycle from ferric (Fe III) or ferrous (Fe II) particle-based separation processes, iron oxide-based materials, or the like. When ferrous (Fe II) materials are employed, an oxidizing agent is preferably introduced to convert ferrous solids to the desired ferric state.

In its simplest embodiment, the process of the present invention comprehends mixing of contaminated wastewater with sludge comprising ferric (Fe III) particulates, followed by liquid/solids separation to partition the contaminants in the solids fraction. Substantial contaminant removal may be achieved directly in a tailings pond simply by mixing the wastewater with sediment collected on the pond bottom. Sediment collected on the pond bottom generally comprises ferric particulates which undergo chemical and physical reactions with the inorganic contaminants to precipitate soluble contaminants in a stable, insoluble form. Liquid/solids mixing in the tailings pond is followed by a settling period to promote liquid/solids separation. After suitable mixing and settling periods, liquid withdrawn from the pond has reduced levels of inorganic contaminants. Sediment mixing in the tailings pond is preferably employed as a pretreatment stage in combination with a more comprehensive contaminant removal procedure, since it generally does not provide complete contaminant removal.

When retention (or collection) of wastewater in a tailings pond is used in combination with a ferric particle-based contaminant removal process such as a ferric adsorption process, enhanced removal of soluble contaminants may be achieved in a tailings pond pretreatment stage when solids residues from the ferric particle-based contaminant removal process are discharged into the tailings pond. Discharge of residues comprising ferric and/or ferrous particles to the tailings pond enriches the ferric particulate content of the pond sediment and provides improved physical and chemical reaction kinetics for precipitation of soluble contaminants. Discharge of residues comprising ferric particles to an area of the tailings pond in proximity to the wastewater treatment intake means is especially preferred to provide liquid/solids turbulence and contact, thereby creating a contaminant removal pretreatment stage in the tailings pond in proximity to the wastewater treatment intake means. Some solids settling is preferably permitted prior to withdrawal of wastewater from the tailings pond for treatment, since carry-over of solids to the wastewater treatment facility is generally undesirable.

FIG. 1 schematically illustrates a preferred embodiment of the contaminant removal process of the present invention wherein wastewater is treated sequentially in multiple sludge treatment stages. Each treatment stage provides contact between ferric (Fe III) particulates and soluble inorganic contaminants under reaction conditions which promote both chemical and physical reactions resulting in the precipitation of soluble inorganic contaminants. Multiple sludge treatment stages providing relatively short retention times in each stage provide significantly improved contaminant precipitation and removal compared to an equivalent retention time in a single or fewer process stages. Following each treatment stage, liquid/solids separation is effected and inorganic contaminants are partitioned from the wastewater with the solids fraction.

Sludge is introduced to and mixed with wastewater in wastewater conduit 10 through sludge supply conduit 13. Sludge is provided from sludge reservoir 22, and is preferably introduced in quantities of about 1% to about 90% v/v with influent wastewater depending, in part, on the sludge density. High sludge loading of at least 50% v/v with influent wastewater is preferred throughout the multiple stage contaminant removal process to promote removal of soluble contaminants by chemical and physical reactions. Sludge loading may, however, be limited by sludge handling or volume constraints, and benefits may be conferred with lower sludge loading levels. Liquid/solids mixing means 14 is preferably provided as an in-line mixer positioned downstream from the introduction of sludge to provide complete liquid/solids mixing prior to introduction of the liquid/solids mixture into first stage reaction vessel 20. Mixing means 14 may be provided as a mechanical mixing means, aerator, baffles or the like providing turbulence and liquid/solids mixing. Suitable mixing means may also be provided in first stage reaction vessel 20 if necessary to promote liquid/solids contact or flocculation. The liquid/solids mixture is then conveyed through liquid/solids conduit 15 to first stage reaction vessel 20.

According to the embodiment illustrated in FIG. 1, first stage reaction vessel 20 serves primarily as a settling tank for liquids/solids separation. The liquid/solids mixture may alternatively be conveyed to a liquid/solids separator remote from the reaction vessel, but separation is preferably achieved in the reaction vessel itself. Separation may be achieved in first stage reaction vessel 20 simply by permitting solids to collect in a zone near the bottom of the reaction vessel. A settling or flocculating agent may be introduced into the reaction vessel to facilitate separation and settling of the particulates. As shown in FIG. 1, flocculating agent is introduced into first stage reaction vessel 20 from settling agent reservoir 38 through supply conduit 16. Flocculating agent may alternatively be introduced to and mixed with the wastewater prior to conveyance of the liquid/solids mixture to the reaction vessel.

Suitable settling and flocculating agents are well known in the art. Both anionic and cationic polymer flocculating agents, as well as aluminum and other metal-based flocculating agents are suitable for use with the process of the present invention. Liquid polymer flocculating agents IT31 and IT35 available from Alchem Inc. in Burlington, Ontario, Canada, are especially preferred for use in the process of the present invention. Although liquid/solids separation after each sludge treatment stage is an important feature of the present invention, substantial separation, that is, liquid/solids separation which is about 70% to about 100% complete is sufficient, and procedures for achieving complete liquid/solids separation need not be employed.

After first stage treatment is completed and liquids/solids separation has been effected, treated liquids are conveyed through liquid conduit 21 and sludge is introduced to and mixed with wastewater for second stage treatment in the same fashion described above with reference to first stage sludge treatment. Treatment in second, third and fourth reaction vessels 30, 40 and 50, respectively, proceeds in substantially the same fashion as described above with reference to the first stage treatment, and reaction conditions in each of the multiple treatment stages are preferably substantially the same. Treated wastewater is discharged from first, second, third and fourth reaction vessels 20, 30, 40 and 50, respectively, by means of wastewater conduits 21, 31, 41 and 51. Sludge is introduced to wastewater conduits 21, 31 and 41 through sludge conduits 23, 33 and 43, respectively. Liquid/solids mixing means 24, 34 and 44 are provided as in-line mixers for mixing of liquids and solids prior to introduction into second, third and fourth stage reaction vessels 30, 40 and 50, respectively. Suitable mixing means may also be provided in second, third and fourth stage reaction vessels if necessary to promote liquid/solids contact or flocculation. Solids withdrawal conduits 27, 37 and 47 are provided for withdrawal of solids after treatment in the second, third and fourth treatment stages. Settling agent supply conduits 26, 36 and 46 provide settling or flocculating agent to the second, third and fourth reaction stages, respectively, from settling agent reservoir 38.

Solids withdrawn from one or more of the treatment reaction vessels may be recycled through sludge recycle conduit 39 to sludge reservoir 22 for use in subsequent sludge treatment stages. Sludge recycle provides process economies and reduces the overall volume of process solids discharge. Sludge recycle should, however, be limited to about three to about eight, and preferably about three to about five recycle applications, since recycling sludge beyond these limits results in reduced contaminant removal and process efficiency. Excess or spent sludge may be discharged from the system through sludge disposal conduit 49.

Sludge treatment is provided in multiple, sequential stages with relatively short liquid/solids mixing times utilized in each treatment stage. Short liquid/solids mixing times on the order of about 2 minutes to about 12 minutes in each sludge treatment stage are preferred, and liquid/solids mixing times of about 4 minutes to about 8 minutes are especially preferred. The process of the present invention preferably employs from about two to about six sludge treatment stages. Three or four sludge treatment stages are especially preferred to provide substantial removal of soluble contaminants, particularly arsenic, from wastewater.

Introduction of an oxidizing agent prior to sludge treatment is preferred to facilitate removal of arsenic contaminants from solution. Complete mixing of the oxidizing agent with wastewater is preferably achieved prior to sludge addition, so that substantially all solubilized arsenic is in the oxidized As(V) state when sludge particulates are introduced. As shown in FIG. 1, oxidizing agent is conveyed to wastewater conduit 10 from oxidizing agent reservoir 28 through oxidizing agent supply conduit 29. Mixing means 12 is provided as an in-line mixer and located intermediate the introduction of oxidizing agent and sludge to facilitate substantially complete oxidation prior to sludge addition.

Suitable oxidizing agents are well known in the art and include hydrogen peroxide, chlorine, permanganate, and the like. Hydrogen peroxide is especially preferred for use as an oxidizing agent since it does not generate undesirable oxidation reaction by-products. Hydrogen peroxide is preferably introduced in a quantity sufficient to achieve molar $H_2O_2$:As ratios of about 0.2:1.0 to about 2:1, and most preferably about 1.0:1.0.

When the wastewater comprises significant levels of soluble cyanide contaminants, a cyanide oxidation catalyst is preferably introduced in addition to the oxidizing agent to promote conversion of free cyanide in solution to complexed metallo-cyanide forms which are more easily oxidized. Oxidation and removal of soluble cyanide contaminants may then proceed simultaneously with oxidation of soluble arsenic and other inorganic contaminants. Suitable cyanide oxidation catalysts are well known in the art and include, for example, copper sulfate, copper salts, and the like. Copper sulfate is an especially preferred cyanide oxidation catalyst, due to its availability and relatively low cost. Cyanide oxidation catalyst is preferably introduced into the wastewater prior to or coincident with introduction of the oxidizing agent. As shown in FIG. 1, cyanide oxidation catalyst is conveyed from catalyst reservoir 18 through supply conduit 19 and introduced into wastewater conduit 10 prior to addition of oxidizing agent. In-line mixer 11 is provided to facilitate mixing of catalyst with free cyanide in solution to promote formation of metal-locyanide complexes. When catalyzed oxidation of cyanide is conducted simultaneously with oxidation of inorganic, and particularly arsenic contaminants, oxidizing agent such as $H_2O_2$ is introduced in a quantity sufficient to provide substantially complete oxidation of both arsenic and cyanide contaminants. Excess oxidizing agent may be provided, if necessary, to promote oxidation of ferrous (Fe II) materials to the desired ferric (Fe III) state.

Since oxidizing agents generally, and hydrogen peroxide in particular, are relatively expensive reagents, oxidation of soluble contaminants such as arsenic and cyanide is preferably monitored by monitoring the oxidation-reduction potential of the wastewater treatment solution. Relative degrees of arsenic and cyanide oxidation are proportional to the oxidation-reduction potential (ORP) of the wastewater, and the ORP of the solution may be conveniently monitored by means of voltage measurements, ORP meters, or the like. Hydrogen peroxide may then be introduced only as necessary to provide substantially complete oxidation of soluble arsenic and cyanide contaminants, as well as ferrous sludge components. Since hydrogen peroxide is a strong oxidizing agent, appropriate precautions must be taken to prevent leakage and the like, as is well known in the art.

Preferred reaction conditions enhance overall removal of inorganic and cyanide contaminants and improve process efficiency. pH conditions during each sludge treatment stage are preferably maintained at about 8 or below, and most preferably from about 3 to about 7. The pH of influent wastewater is measured and pH adjustment is preferably achieved, if necessary, prior to mixing of oxidizing agent and sludge with the wastewater during first stage sludge treatment. Incoming wastewater having a pH from about 3 to about 9 generally does not require pH adjustment.

Although multiple stage sludge treatment according to the process of the present invention has been described with reference to a preferred process design employing inline mixers, chemical reagent and sludge addition, it will be recognized that sludge, oxidizing agent and catalyst may be introduced directly to the reaction vessels, with both mixing and liquid/solids separation taking place directly in the reaction vessels.

Multiple stage sludge treatment as described above with reference to FIG. 1 may be used as a stand-alone process providing removal of about 50% to about 99% of soluble arsenic in raw wastewater. Multiple stage sludge treatment according to this embodiment provides substantial removal of soluble arsenic and cyanide contaminants from solution, in a process which requires minimal equipment and materials costs and provides high throughput rates and short treatment times. Multiple stage sludge treatment may also be used in combination with other treatment processes such as a ferric adsorption process, to provide substantially complete removal of contaminants from wastewater.

FIG. 2 illustrates an improved ferric adsorption process according to the present invention which employs many of the principles set forth above. The improved ferric adsorption process may be utilized as a standalone contaminant removal process, or it may be used in combination with the multiple stage sludge treatment process described above with reference to FIG. 1, as illustrated in FIG. 3. The ferric adsorption process illustrated in FIG. 2 is similar to conventional ferric adsorption processes, but it employs process modifications designed to maximize contaminant removal and efficiency while reducing chemical reagent and equipment costs.

Oxidation of soluble arsenic and cyanide contaminants is preferably carried out as necessary in the same fashion as described above with reference to multiple stage sludge treatment. According to the embodiment illustrated in FIG. 2, wastewater is conveyed from a raw wastewater source through wastewater conduit 10 and delivered to oxidation reaction vessel 56. Oxidizing agent is supplied to oxidation reaction vessel 56 from oxidizing agent supply reservoir 52 by means of oxidizing agent supply conduit 53. Cyanide oxidation catalyst is preferably provided to accelerate the oxidation of soluble cyanide contaminants in the wastewater, and catalyst is preferably introduced into new wastewater conduit 10 from catalyst supply reservoir 54 through supply conduit 55 prior to reaction in the oxidation reaction vessel. Alternatively, cyanide oxidation catalyst may be introduced directly into oxidation reaction vessel 56.

Wastewater is retained in oxidation reaction vessel 56 until substantially all soluble arsenic and cyanide contaminants have been oxidized. Oxidation of other inorganic contaminants to oxidized forms which are more susceptible to chemical and/or physical reaction may also take place. Mixing of the oxidation reaction vessel liquid contents is preferably provided to promote substantially complete oxidation. It is an important feature of the improved contaminant precipitation/removal process of the present invention that substantially complete oxidation of soluble arsenic and cyanide contaminants is achieved prior to the contaminant removal phase of the process. Oxidation is preferably monitored by periodically measuring the oxidation-reduction potential of the liquids, as described above. pH conditions in oxidation reaction vessel 56 are preferably maintained below about 8, from about 3 to about 7, and most preferably from about 5 to about 7.

When substantially complete oxidation has been achieved, wastewater is conveyed through wastewater conduit 57 to contaminant removal reaction vessel 60. Contaminant removal reagent is introduced into the contaminant removal reaction vessel from supply reservoir 58 through supply conduit 59. Ferric sulphate ($Fe_2(SO_4)_3 \times H_2O$) is a preferred reagent for formation of ferric hydroxide and/or ferric oxide particulates in the reaction vessel, and is well known for its ability to remove toxic metals from solution. Ferric sulphate is preferred due to its availability and relatively low cost, but other ferric reagents are known in the art and may be used to provide ferric hydroxide and/or ferric oxide particulates for the contaminant precipitation/removal reaction. Although ferric sulfate is conventionally used in ferric adsorption processes wherein soluble metallic contaminants are complexed with the ferric particulates and thereby removed from solution, it is believed that the ferric adsorption process of the present invention promotes both chemical and physical reactions facilitating removal of soluble contaminants from solution.

Significantly reduced quantities of ferric sulphate are required for contaminant removal by chemical and physical reactions according to the process of the present invention, compared to conventional ferric adsorption processes. Ferric sulphate is introduced into contaminant removal reaction vessel 60 in quantities sufficient to attain molar Fe:As ratios of about 0.2:1 to about 2:1, and molar ratios of about 1.0:1.0 or less typically provide substantially complete precipitation of soluble arsenic contaminants to stable ferric arsenate compounds and/or ferric hydroxide complexes. Mixing in contaminant removal reaction vessel 60 is provided as necessary to promote contact between particulates and soluble contaminants. pH conditions in reaction vessel 60 are preferably maintained below about 8, from about 3 to about 7, and most preferably from about 3 to about 5. Retention times in contaminant removal reaction vessel 60 vary depending upon contaminant levels in the influent wastewater, but can be expected to range from about 1 to about 10 minutes, and are preferably from about 4 to about 7 minutes.

When removal of inorganic contaminants from solution by chemical and/or physical reaction is substantially complete, the liquid/solids admixture is conveyed through liquid/solids conduit 61 to neutralization reaction vessel 64. Neutralization of the liquid/solids admixture may be required prior to discharge of the treated liquid effluent to comply with treated water discharge requirements. Neutralizing agent is supplied to reaction vessel 64 as necessary from neutralizing agent supply reservoir 62 through neutralizing agent supply conduit 63. A suitable neutralizing agent, such as lime, sodium hydroxide or the like is introduced into neutralization reaction vessel 64 as necessary to elevate the pH of the liquid/solids admixture to about 6.5 to about 7.5. Mixing of neutralizing agent with the liquid/solids contents of the neutralization reaction vessel is preferably provided to accelerate and provide accurate pH adjustment. Neutralization is unnecessary when the liquid/solids admixture withdrawn from contaminant removal reaction vessel 60 is at a substantially neutral pH.

After the neutralization reaction is complete, the liquid solids admixture is withdrawn from reaction vessel 64 and conveyed through liquid/solids conduit 65 to reaction vessel 68, wherein a suitable settling or flocculating agent is introduced to promote settling and separation of solids. Settling or flocculating agent is conveyed through supply conduit 67 from flocculating agent supply reservoir 66. A liquid polymer flocculating agent of the type described above in connection with the multiple stage sludge treatment process is preferred since it provides convenient handling characteristics. Other types of flocculating agents which are well known in the art may also be used. Mixing of liquids and solids is preferably provided to promote flocculation and facilitate liquid/solids separation.

The liquid/solids admixture is thereafter withdrawn through liquid/solids conduit 69 and introduced into liquid/solids separation means 70. Liquid/solids separation means 70 preferably comprises a clarifier or thickener such as a lamella clarifier, wherein settling of solids occurs on a plurality of angled trays or plates. Other suitable types of clarifiers are known in the art and may be utilized with the process of the present invention. Separation means 70 preferably provides substantially complete separation of liquids and solids, and water substantially free of solids, inorganic contaminants such as arsenic, and cyanide contaminants is discharged through purified liquid conduit 72. Solids are collected and withdrawn through solids discharge conduit 71. Solids withdrawn from this contaminant removal process through discharge conduit 71 contain substantial quantities of ferric particulates, and may be collected for use in the multiple stage sludge treatment process described above with reference to FIG. 1.

FIG. 3 illustrates an integrated contaminant removal process according to the present invention wherein the multiple stage sludge treatment process illustrated in FIG. 1 is employed in combination with the contaminant removal process illustrated in FIG. 2. Reference numerals used in FIG. 3 refer to the elements having identical reference numerals described above with reference to FIGS. 1 and 2. As shown in FIG. 3, multiple stage sludge treatment proceeds in substantially the same fashion as described above with reference to FIG. 1. Mixing means have not been illustrated for purposes of clarity, but should be provided as previously described. Addition of oxidizing agent, catalyst and sludge in the multiple stage sludge treatment process also proceeds as previously described. Raw wastewater in conduit 10 is initially mixed with cyanide oxidation catalyst from reservoir 18, and subsequently treated with oxidizing agent from reservoir 28 to promote oxidation of both cyanide and arsenic contaminants. If the untreated wastewater is not contaminated with cyanide components, introduction of the cyanide oxidation catalyst is, of course, unnecessary. Sludge is introduced to wastewater through sludge supply conduits 13, 23, 33 and 43 prior to treatment in first, second, third and fourth stage reaction vessels 20, 30, 40 and 50, respectively. Reaction conditions and liquid/solids mixing times in each of the sludge treatment stages are substantially he same and are as described above with reference to FIG. 1. Flocculating agent is preferably provided in each sludge treatment stage from reservoir 38 to promote solids settling and separation. Solids withdrawn from each treatment stage are preferably recycled through conduit 39 to sludge reservoir 22.

Treated wastewater discharged from the multiple stage contaminant removal process through discharge conduit 51 is conveyed to contaminant removal reaction vessel 60. It is generally unnecessary to introduce additional oxidizing agent or cyanide oxidation catalyst to the wastewater prior to treatment in contaminant removal reaction vessel 60, since complete oxidation of inorganic and cyanide contaminants prior to multiple stage sludge treatment should be sufficient. Contaminant removal reagent, preferably ferric sulfate, is introduced into reaction vessel 60 from supply reservoir 58 through supply conduit 59 based upon levels of residual arsenic in solution to achieve molar Fe:As ratios of about 0.2:1 to about 2:1, and most preferably about 1.0:1.0. Reaction conditions and liquid/solids mixing times are substantially as described above with reference to FIG. 2.

Liquid/solids materials are thereafter conveyed to neutralization reaction vessel 64, flocculation reaction vessel 68 and liquid/solids separation means for treatment as described above with reference to FIG. 2. Flocculating agent is preferably supplied from central reservoir 38 through supply conduit 42. Solids discharged from liquid/solids separation means 70 through solids discharge conduit 71 are preferably conveyed through sludge recycle conduit 39 to sludge reservoir 22 for utilization in the multiple stage contaminant removal process.

The integrated contaminant removal process illustrated in FIG. 3 provides substantially complete removal of soluble arsenic and cyanide contaminants from wastewater and demonstrates significantly improved overall process efficiencies. Processing of wastewater by oxidation and multiple stage sludge treatment achieves substantial removal of soluble arsenic and cyanide contaminants at low chemical reagent consumption rates, and substantially reduces the ferric sulfate requirement for treatment in contaminant removal reaction vessel 60. Recycling of ferric particles also provides improved process efficiency. Fluctuations in contaminant removal efficiencies in the two phases of the integrated treatment process, the multiple stage sludge treatment phase and the ferric adsorption phase, are substantially self-regulating since lower efficiencies in the multiple stage sludge treatment result in higher contaminant levels and higher ferric sulfate consumption requirements in reaction vessel 60, which provides recycle of larger quantities of "fresh" ferric particles for multiple stage sludge treatment. Likewise, high contaminant removal efficiencies in the multiple stage sludge treatment phase result in lower contaminant levels and lower ferric sulfate consumption requirements in reaction vessel 60, which results in recycle of smaller quantities of "fresh" ferric particles for multiple stage sludge treatment.

Although the improved process of the present invention has been described with reference to schematic flow diagrams, it will be recognized that certain mechanical devices which have not been illustrated, such as pumps, liquid and/or solids flow meters and controllers, pH meters, ORP meters and the like may be provided as necessary to monitor contaminant removal and achieve process liquid and liquid/solids flow requirements. In addition, automated control mechanisms may be incorporated so that the process proceeds in an automated fashion, requiring minimal monitoring and supervision.

The following specific examples are set forth for purposes of illustration and are not intended to limit the present invention in any way.

EXAMPLE I

Bench scale experiments were conducted to demonstrate the efficacy of a multiple stage sludge treatment process similar to that illustrated in FIG. 1 for removal of arsenic from wastewater containing relatively low levels of soluble arsenic. The soluble arsenic level in the untreated wastewater was 48-50 mg/liter, as determined by hydride generation/atomic absorption analysis. Hydrogen peroxide was introduced to the untreated wastewater in a quantity corresponding to a molar ratio of about 1.0:1.0 $H_2O_2$:As prior to multiple stage sludge treatment to facilitate oxidation of soluble arsenic contaminants.

The sludge used for multiple stage treatment was collected from the final stage clarification of a ferric contaminant removal process similar to that described above with reference to FIG. 2 and had a solids content of about 40-50% v/v solids/total sludge content. A common sludge pool was used to simulate process conditions during recycling of sludge particulates. For each sludge treatment stage, about 20% sludge (v/v with wastewater) was vigorously mixed with the wastewater for about 5 minutes. Each sludge treatment stage required addition of about 10% to about 20% of the sludge pool, and solids were returned to the sludge pool after each treatment stage. Liquid polymer flocculating agent (0.1% Alchem IT31) was added at a rate of about 10 ml/L wastewater at each sludge addition site to facilitate liquid/solids separation. After each sludge treatment stage, particulates were separated from the aqueous solution by settling prior to treatment in the next sequential sludge treatment stage, and samples were withdrawn from the supernatant for arsenic analyses. Four substantially identical sludge treatment stages were employed. The experimental results were as follows:

|  | After First Treatment Stage | After Second Treatment Stage | After Third Treatment Stage | After Fourth Treatment Stage |
|---|---|---|---|---|
| Arsenic Level (mg/L) | 16 | 4-5 | 1-2 | 1 |
| Arsenic Removal (%) |  |  |  |  |
| each | 67 | 24 | 6 | 1 |

|  | After First Treatment Stage | After Second Treatment Stage | After Third Treatment Stage | After Fourth Treatment Stage |
|---|---|---|---|---|
| treatment stage |  |  |  |  |
| Cumulative | 67 | 91 | 97 | 98 |

As the experimental results demonstrate, substantially all soluble arsenic was removed from wastewater during multiple stage sludge treatment. Since this treatment involves minimal equipment and chemical requirements, the economic advantages of this treatment are significant. When a multiple stage sludge treatment process of this type is used in combination with a conventional wastewater treatment process, chemical consumption requirements for the downstream wastewater treatment process are also significantly reduced.

EXAMPLE II

Bench scale experiments were conducted to determine the effect of different sludge loading characteristics on the removal of soluble arsenic from wastewater containing relatively high levels of soluble arsenic. The soluble arsenic level in untreated wastewater was 1494 mg/liter, as determined by atomic absorption spectrophotometry. Hydrogen peroxide was introduced to the untreated wastewater in a quantity corresponding to a molar ratio of about 1:0:1:0 $H_2O_2$:As prior to sludge treatment to facilitate oxidation of soluble arsenic contaminants.

The quantity of sludge introduced for each sludge treatment stage was varied from 5% to 50% v/v with respect to the wastewater. The sludge used for treatment was collected in and returned to a common sludge pool as described in Example I. The sludge density was about 45% to 50% solids v/v with respect to the total liquid/solids volume, and the specific gravity of the sludge slurry was about 1.10. Sludge was vigorously mixed with the wastewater for about 2 minutes. pH adjustment was unnecessary as the pH of the untreated wastewater was about 7. Gravity settling, without addition of a flocculating agent, was allowed to proceed for a minimum of 60 minutes. The supernatant was analyzed for arsenic, and the results were as follows:

| Sludge Addition (v/v with solution) (%) | Arsenic Level After Single Stage Treatment (mg/L) | Reduction in Arsenic Level |
|---|---|---|
| 0% | 1494 | — |
| 5% | 1210 | 19 |
| 10% | 1021 | 32 |
| 20% | 811 | 46 |
| 50% | 439 | 71 |

As these experimental results demonstrate, treatment with higher concentrations of sludge provides significantly reduced levels of soluble arsenic in wastewater. Sludge treatment with up to or in excess of 50% sludge, v/v with wastewater solution is preferred to provide improved removal of soluble arsenic from contaminated wastewater having relatively high levels of arsenic in solution. The experimental results indicate that significant reductions in soluble arsenic (about 70%) are achieved during a single stage sludge treatment for relatively high solubilized arsenic levels of about 1500 mg/L.

EXAMPLE III

Removal of soluble inorganic and cyanide contaminants was measured after wastewater treatment in a ferric adsorption process designated "Process I" of the type illustrated in FIG. 2. Removal of soluble inorganic and cyanide contaminants was also measured after wastewater treatment in a contaminant removal process designated "Process II" of the type illustrated in FIG. 3 incorporating a multiple stage sludge treatment phase followed by a ferric adsorption phase. Reaction conditions during the multiple stage sludge treatment phase of Process II were substantially the same as described above with reference to Example I, while reaction conditions during the second phase ferric adsorption process were substantially the same as utilized in "Process I" and described above with reference to FIG. 2.

Reaction conditions in Processes I and II were optimized to provide substantially complete removal of arsenic from solution. Hydrogen peroxide was introduced in molar ratios of about 1.0:1.0 $H_2O_2$:As prior to addition of ferric sulfate in both Process I and Process II. This process optimization required Fe:As molar ratios of about 3:1 in Process I, while Fe:As molar ratios of about 1:1 were maintained in Process II. Although soluble arsenic removal was substantially complete in both experimental trials, chemical consumption, particularly ferric sulfate consumption, required for Process (II) was significantly reduced compared to the chemical consumption requirements for Process I, and removal of other soluble inorganic and cyanide contaminants was significantly lower. The experimental results are as follows:

| REMOVAL EFFICIENCIES OF PROCESS I COMPARED TO PROCESS II | | |
|---|---|---|
| | Process I (% Removal) | Process II (% Removal) | Improvement In Removal Efficiency for Integrated Process (%) |
| Arsenic | 99 | 99 | 0 |
| Copper | 95 | 99 | 4 |
| Manganese | 96 | 98 | 2 |
| Nickel | 83 | 91 | 8 |
| Silicon ($SiO_2$) | 53 | 95 | 42 |
| Strontium | 1 | 98 | 97 |
| Cyanide (Total) | 63 | 99 | 36 |

The experimental results indicate that the integrated process of the present invention as described with reference to FIG. 3 provides improved removal of soluble inorganic contaminants, such as copper, manganese, nickel, silicon, and strontium, as well as cyanide contaminants, compared to ferric particle adsorption processes of the type shown in FIG. 2 alone. In addition to providing improved contaminant removal, chemical consumption in the integrated process of the present invention is significantly reduced due to substantial removal of contaminants in the sludge treatment stages.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

I claim:

1. A multiple discrete stage process for reducing the level of soluble arsenic contaminants in an aqueous solution to a predetermined low level, comprising:

oxidizing any of said soluble arsenic contaminants not in the (V) oxidation state to the (V) oxidation state;

mixing an arsenic removal sludge having one or more components selected from the group consisting of: ferric oxide particulates; ferric hydroxide particulates; ferrous oxide particulates; and ferrous hydroxide particulates with the aqueous solution in a first discrete reaction stage and recovering a first treated solution having reduced levels of said soluble arsenic contaminants, said arsenic removal sludge reducing levels of said soluble arsenic contaminants in said aqueous solution by forming ferric arsenate and/or by adsorbing said soluble arsenic contaminants onto said arsenic removal sludge;

mixing said first treated solution with additional arsenic removal sludge in a second discrete reaction stage and recovering a second treated solution having further reduced levels of said soluble arsenic contaminants;

treating said second treated solution in third or further discrete reaction stages with additional arsenic removal sludge if said second treated solution has a soluble arsenic contaminant level above said predetermined low level; and maintaining the pH level of the aqueous solution and treated solutions at a pH of 8 or less during treatment in the first, second, and further reaction stages.

2. A process according to claim 1, comprising from about three to about six of said discrete reaction stages.

3. A process according to claim 1, wherein mixing times of about 2 minutes to about 12 minutes are provided in each of said discrete reaction stages.

4. A process according to claim 3, wherein mixing times of about 4 minutes to about 8 minutes are provided in each of said discrete reaction stages.

5. A process according to claim 1, wherein said oxidizing said soluble arsenic contaminants to a higher oxidation state is achieved by introducing an oxidizing agent into the aqueous solution prior to mixing with said arsenic removal sludge in the first of said discrete reaction stages.

6. A process according to claim 5, wherein said oxidizing agent comprises hydrogen peroxide, and said hydrogen peroxide is introduced in an amount sufficient to achieve molar $H_2O_2$:Arsenic ratios of about 0.2:1.0 to about 2:1.

7. A process according to claim 1 wherein the aqueous solution includes cyanide contaminants and the process additionally comprises oxidizing the cyanide contaminants prior to mixing with said arsenic removal sludge.

8. A process according to claim 7, wherein said cyanide contaminants comprise free cyanide and complexed metallo-cyanides, and the process additionally comprises mixing a cyanide oxidation catalyst with the aqueous solution prior to mixing with said arsenic removal sludge to promote conversion of said free cyanide to said complexed metallo-cyanides.

9. A process according to claim 8, wherein said cyanide oxidation catalyst comprises copper sulfate and said oxidizing agent comprises hydrogen peroxide.

10. A process according to claim 1 wherein said arsenic removal sludge is mixed with the aqueous solution and treated solutions in each of said discrete reaction stages in quantities of about 10% to about 90% v/v.

11. A process according to claim 10, wherein said arsenic removal sludge is mixed with the aqueous solution and treated solutions in each of said discrete reaction stages in quantities of at least about 50% v/v.

12. A process according to claim 1 additionally comprising recycling said arsenic removal sludge separated from said aqueous solution and said treated solutions after each of said discrete reaction stages for use in one or more of said discrete reaction stages.

13. A process according to claim 1, wherein said reaction conditions include maintaining the pH level of the aqueous solution at about 3 to about 7 during treatment in each of said plurality of discrete reaction stages.

14. A process according to claim 1 wherein the treated solution withdrawn from the final of said discrete reaction stages is substantially free from dissolved arsenic.

15. A process according to claim 1 additionally comprising treating said aqueous solution having said predetermined low level of said soluble arsenic contaminants in a second phase treatment process comprising: mixing said aqueous solution with ferric sulfate at a pH level sufficient to form ferric hydroxide particulates which chemically and/or physically react with residual soluble arsenic contaminants and/or other inorganic contaminants and undesired solids remaining in said treated aqueous solution to form a purified liquid.

16. A process according to claim 15, wherein said ferric sulfate is introduced in amounts sufficient to provide molar Fe:As ratios of about 1.0:1.0 or less.

17. A process according to claim 15 wherein reaction conditions in said second phase treatment process include maintaining the pH level of said treated liquid at about 3 to about 7.

18. An improved process according to claim 15, additionally comprising recycling solids separated from said purified liquid in said second phase treatment process for use as said arsenic removal sludge in any of said discrete reaction stages.

* * * * *